(12) United States Patent
Shriver

(10) Patent No.: US 6,290,359 B1
(45) Date of Patent: Sep. 18, 2001

(54) IMAGE FORMING APPARATUS AND METHOD FOR LIVE PERFORMANCE

(75) Inventor: Gregory B. Shriver, Durham, NC (US)

(73) Assignee: The Potomac Company, L.L.C., Silver Spring, MD (US)

( * ) Notice: Subject to any disclaimer, the term of this patent is extended or adjusted under 35 U.S.C. 154(b) by 0 days.

(21) Appl. No.: 09/539,780

(22) Filed: Mar. 31, 2000

Related U.S. Application Data

(63) Continuation-in-part of application No. 09/368,167, filed on Aug. 5, 1999.

(51) Int. Cl.⁷ ................................................. G03B 21/28
(52) U.S. Cl. ................................................. 353/28; 359/629
(58) Field of Search ................................. 353/28, 30, 98, 353/10; 359/478, 629, 630; 472/58, 61, 63

(56) References Cited

U.S. PATENT DOCUMENTS

| | | |
|---|---|---|
| 570,255 | 10/1896 | Kerner . |
| 663,267 | 12/1900 | Fitch . |
| 1,166,701 | 1/1916 | Mansfeld . |
| 1,448,153 | 3/1923 | Schneider . |
| 1,456,233 | 5/1923 | Hammond et al. . |
| 1,636,112 | 7/1927 | Schufftan . |
| 1,636,834 | 7/1927 | Peters et al. . |
| 1,775,237 | 9/1930 | Dawley et al. . |
| 2,054,414 | 9/1936 | Fleischer . |
| 2,310,339 | 2/1943 | Arndt . |
| 2,336,508 | 12/1943 | Smith et al. . |
| 2,402,822 | 6/1946 | Kraft . |
| 2,727,427 | * 12/1955 | Jenkins . |
| 2,727,429 | 12/1955 | Jenkins . |
| 2,857,806 | 10/1958 | Shuftan . |
| 2,861,806 | 11/1958 | Disney . |
| 2,870,672 | 1/1959 | Gage et al. . |
| 2,934,601 | 4/1960 | Oppenheimer . |
| 2,952,182 | 9/1960 | Marks et al. . |
| 3,006,241 | 10/1961 | Marks et al. . |
| 3,035,836 | * 5/1962 | McCulley . |
| 3,084,933 | 4/1963 | Alswang . |
| 3,085,799 | 4/1963 | Alswang . |
| 3,180,211 | 4/1965 | Armstrong . |
| 3,182,547 | 5/1965 | Armstrong . |
| 3,366,438 | 1/1968 | Hartman . |

(List continued on next page.)

FOREIGN PATENT DOCUMENTS 2 714 741  12/1993  (FR) .

OTHER PUBLICATIONS

European Search Report No. PCT/us00/20062 dated Oct. 6, 2000.

Primary Examiner—William Dowling
(74) Attorney, Agent, or Firm—Millen, White, Zelano & Branigan, P.C.

(57) ABSTRACT

An apparatus and method for forming images visible to performers and to audiences includes a system for forming virtual images and creating visual effects in a stage setting. This system may include a stage and first and second flat panel video displays. The first flat panel video display is visible to the audience through a portal mirror. The second flat panel video display is not visible to the audience; however, images displayed thereon are reflected off of the portal mirror and outwardly to the audience. Finally, a performance area between the back display and the portal mirror is provided for a person or object whereby the audience may see the composite image of the images from the first and second flat panel video displays and the person or object in the performance area on-stage. Alternatively, images on a flat panel video display may be reflected off of a portal mirror so that they are visible in the performance area to a person there.

18 Claims, 6 Drawing Sheets

U.S. PATENT DOCUMENTS

| | | |
|---|---|---|
| 3,493,290 | 2/1970 | Traub . |
| 3,506,351 | 4/1970 | Geitz . |
| 3,515,454 | 6/1970 | Paganelli . |
| 3,551,043 | 12/1970 | Neuberger et al. . |
| 3,655,272 | 4/1972 | Valadez . |
| 4,190,856 | 2/1980 | Ricks . |
| 4,303,316 | 12/1981 | McElveen . |
| 4,306,768 | 12/1981 | Egging . |
| 4,730,218 | 3/1988 | Goodrich ............................. 358/185 |
| 4,736,214 | 4/1988 | Rogers . |
| 4,738,522 * | 4/1988 | Lunde et al. ........................... 353/28 |
| 4,747,665 | 5/1988 | O'Brien . |
| 4,805,895 | 2/1989 | Rogers . |
| 4,974,957 | 12/1990 | Kaelin . |
| 5,024,521 | 6/1991 | Zuchowski et al. . |
| 5,052,797 | 10/1991 | Madsen . |
| 5,061,061 | 10/1991 | Robley et al. . |
| 5,255,028 | 10/1993 | Biles . |
| 5,329,323 | 7/1994 | Biles . |
| 5,331,359 * | 7/1994 | Leclercq ................................ 353/28 |
| 5,528,425 | 6/1996 | Beaver . |
| 5,573,325 * | 11/1996 | Lekowski ............................... 353/28 |
| 5,685,625 * | 11/1997 | Beaver ................................... 353/28 |
| 5,790,124 | 8/1998 | Fischer et al. ....................... 345/435 |
| 5,865,519 * | 2/1999 | Maass ................................... 353/28 |

\* cited by examiner

IMAGE FORMING APPARATUS AND METHOD FOR LIVE PERFORMANCE

This is a continuation-in-part application of U.S. patent application Ser. No. 09/368,167 filed on Aug. 5, 1999, the entire disclosure of which is incorporated herein by reference.

This invention relates to an apparatus and method for forming images visible to audiences and to performers in live stage performances. More specifically, the invention relates to a relatively compact system for forming virtual images and creating visual effects in a stage setting.

BACKGROUND OF THE INVENTION

The art of staging presentations that incorporate optical illusions has been practiced for many years. One of the most popular illusions is created through use of projectors and screens and results in apparent three-dimensional images that a viewing audience sees on-stage during a show or presentation.

These prior art illusion systems can be generally categorized as follows: projections onto gauze or other transparent surfaces; projections on live smoke; three-dimensional film technique; and multiple Blue Room techniques. The categories of systems are discussed in substantial detail in U.S. Pat. No. 4,805,985 to Rogers. The discussion includes detailed explanations of the various different Blue Room techniques.

More recently, changes in technology have allowed for more sophisticated systems with computerized lighting coordinated with projectors. There has even been teaching of combining projection systems with object tracking devices to tie live performances in with the projection system. These types of techniques are described in U.S. Pat. Nos. 5,685,625 and 5,528,425 to Beaver.

Drawbacks with existing technologies noted above include the possible logistic nightmare of a projection system. A screen and projector combination typically requires substantial space between a screen and projector. The combination is also a concern with respect to the registration of the projector itself in relation to the screen. The process of projection convergence and screen alignment is time consuming and requires a skilled technician. In any event, when performing on-stage and using two screens like in Beaver, there must be space between the rear projector and the rear screen as well as space between the second projector and the overhead screen. In smaller auditoriums or meeting places, it is very difficult to try to stage these systems such as, for instance, the Beaver system. Space limitations may require a substantial reduction in the size of the effects area that can be created.

In addition to the foregoing, there are fundamental limitations to projection systems generally. First, the use of lighting on-stage to illuminate a person or actor can wash out the images being projected on the various screens, particularly a back screen. Also, in order to achieve some effects, the screens are movable. Moving screens will require moving projectors and the resulting logistical drawbacks coordinating the projector/screen movement.

Another problem with live presentations is coordinating a live performance with images shown on various screens. The Beaver reference discloses object tracking devices to try to solve this problem, but known tracking systems may not always be reliable. Known tracking systems may also be subject to interference from adjacent metal structures (especially if moving) and from adjacent electrical equipment systems. Tracking systems are also very expensive and difficult to integrate with multiple graphics, video, lighting and other equipment system control software. Rather than using a tracking device, an actor giving a live performance usually must look at an off-stage monitor to see what the audience sees and react accordingly. These side glances can take away from the overall visual effect of a performance. In other words, it is difficult for an actor to see the same composite imagery as the audience, because the actor is in the middle of the composite.

SUMMARY OF THE INVENTION

It is an objection of the present invention, therefore, to overcome the foregoing drawbacks and provide an improved apparatus and method for forming images during live performances.

In one embodiment, an apparatus for displaying visual effects for live presentations involves a stage and a viewing area in which is seated an audience. The stage comprises a foreground side and a background side wherein the foreground side is adjacent the viewing area and the background side is on the side of the stage opposite the foreground side. A back display is comprised of a first flat panel video display wherein the back display is mounted toward the background side of the stage and the first flat panel video display is visible to the audience. A partially-silvered portal mirror is mounted toward the foreground side of the stage at an angle to a vertical plane in front of the audience. A performance area is provided between the back display and the portal mirror. A second flat panel video display that is not visible to the audience displays images that are reflected off of the portal mirror and create a virtual image visible to the audience. The apparatus may further include the portal mirror mounted at an angle so that it is inclined upwardly away from the foreground side of the stage with the second flat panel video display mounted above the stage and above the portal mirror. Alternatively, the portal mirror may be mounted at an angle so that it inclines upwardly toward the foreground side of the stage and a second flat panel video display is mounted below the portal mirror. The apparatus may further include a monitor mirror mounted parallel to the second flat panel video display and on the opposite side of the portal mirror from the second flat panel video display. In a still further embodiment, the apparatus may include an off-stage set including a video camera, a background and a second performance area The video camera records images from the background and second performance area and feeds those images into the first or second flat panel video displays.

The invention also includes a method for creating visual effects during live presentations comprising a number of steps. First, it includes providing a stage and a viewing area in which an audience is seated. This stage comprises a foreground side and a background side wherein the foreground side is adjacent the viewing area and background side is on the side of the stage opposite the foreground side. A back display comprised of a first flat panel video display is mounted toward the background side of the stage and the first flat panel video display is visible to the audience. The stage further includes a partially-silvered portal mirror wherein the portal mirror is mounted toward the foreground side of the stage and further wherein the portal mirror is mounted at an angle to a vertical plane in front of the audience. A performance area between the back display and the portal mirror is provided. A second flat panel video display that is not visible to the audience displays images that are reflected off the portal mirror and create a virtual image visible to the audience. The method further includes the steps of sending signals to the first and second flat panel video displays that form images thereon visible to the audience. The method further includes placing a person or object in the performance area and directing lights on them so that they are visible to the audience. In this method, the audience simultaneously sees the composite image made up of the images from the first and second flat panel video displays and the person or object placed in the performance area. In a further alternative, the method further includes providing a monitor mirror mounted parallel to the second flat panel video display and on the opposite side of the portal mirror from the second flat panel video display. The method also includes in a further variation of providing an off-stage set comprising a video camera, a background and a second performance area wherein the video camera records images from the background and the second performance area and further wherein those images recorded by the video camera are fed into the first or second flat panel video displays.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF PREFERRED EMBODIMENTS

Figure 1:
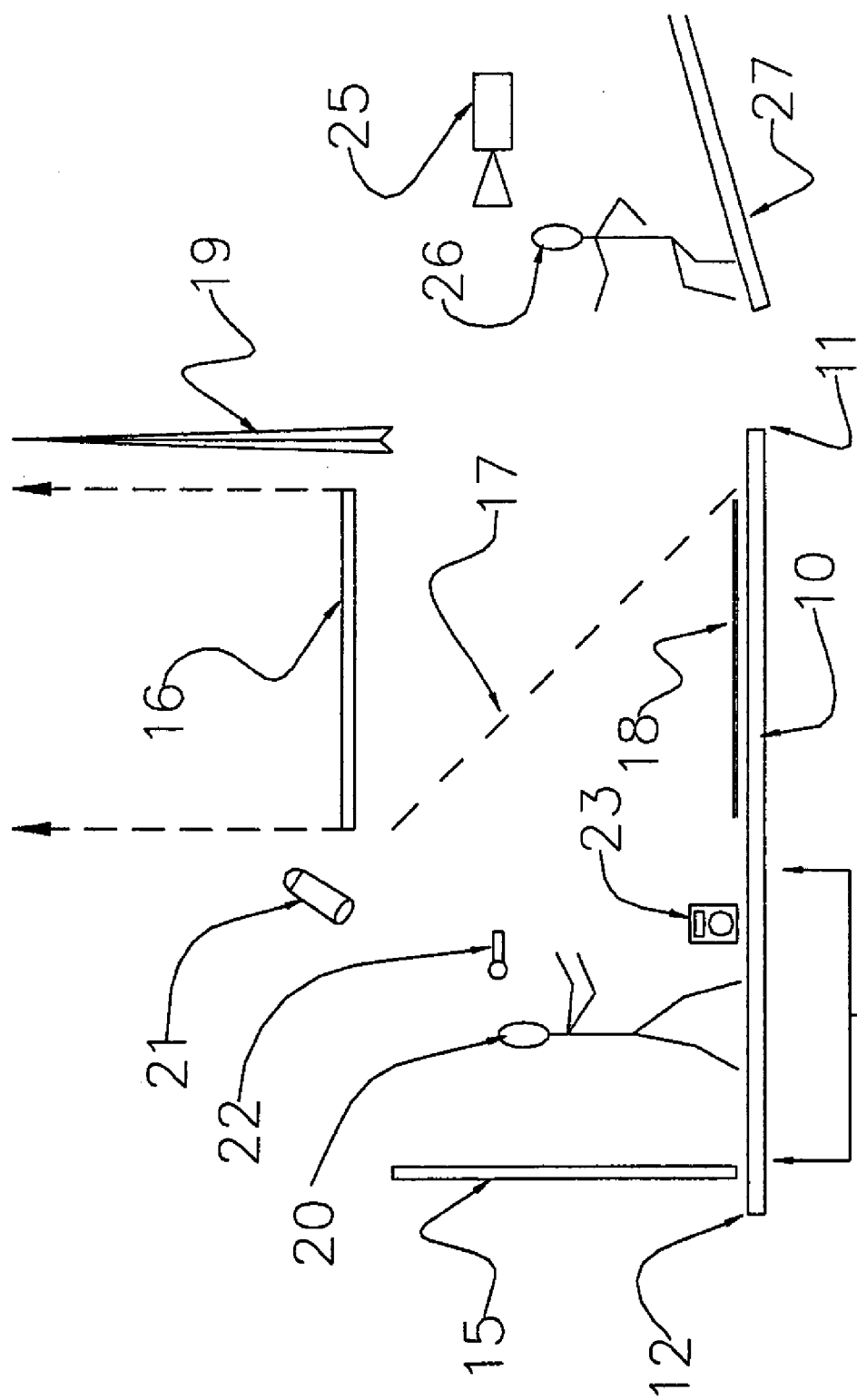
FIG. 1 a schematic side elevation view of an apparatus embodying the present invention.

FIG. 1 illustrates a schematic view of a preferred embodiment the present invention. There is shown a stage 10 having a foreground side 11 and background side 12. The foreground side 11 is adjacent the viewing area 27 in which is seated an audience 26. Toward the background side 12 there is mounted a back display 15. The back display 15 is a flat panel video display. The images that are shown on the back display 15 are visible to the audience 26.

Portal mirror 17 is mounted toward the foreground side 11 of the stage 10. The portal mirror 17 is inclined upwardly away from the foreground side 11 of the stage 10 at an angle to the vertical plane in front of the audience. The portal mirror 17 is only partially silvered. In the preferred embodiment, the portal mirror 17 is 50% silvered thus allowing 50% of light (images) to pass through the mirror 17 such that the audience 26 can see through the portal mirror 17 to see the images on the back display 15.

In between the portal mirror 17 and back display 15 is the portion of the stage 10 referred to as the performance area 13. The performance area 13 is wide enough to allow a person 20 or other object to act or perform on-stage before the audience 26. The person 20 is visible to the audience 26 through the partially-silvered portal mirror 17. The performance area 13 will also typically include a stage monitor loudspeaker 23 and one or more stage microphones 22. Stage lighting 21 illuminates the person 20 or object in the performance area 13.

FIG. 1 further illustrates a second flat panel video display 16 that is mounted above the stage 10 and above the portal mirror 17. The second flat panel video display 16, or overhead display, is further mounted behind a proscenium drape 19 or other curtain so that the audience 26 cannot observe the overhead display. Images that are displayed on the overhead display 16 are reflected off of the portal mirror and outwardly towards the audience 26. The apparatus further includes a monitor mirror 18 that is mounted underneath the portal mirror and parallel to the overhead display 16. The monitor mirror 18 is fully silvered. Because the portal mirror 17 is only partially silvered, a portion of the intensity of the image projected on the overhead display 16 reflects out to the audience, and the remaining intensity of the image passes through the portal mirror 17 and is reflected back upwardly by the monitor mirror 18. A portion of that reflection is then reflected backwardly to the person 20 acting or performing in the performance area 13.

Preferably, the partially silvered mirror is 50% silvered. Therefore, 50% of the light (image) striking the surface of the portal mirror 17 is reflected off the mirror and changed in direction according to the angle of inclination of the mirror, i.e., outwardly towards the audience 26. The other 50% of the light passes straight through the half-silvered mirror. In operation, therefore, this one-half of the image from the overheard display 16 passes straight through the portal mirror 17 hitting the floor underneath it where the monitor mirror 18 is placed. This one half of the image brightness bounces straight back up and hits the underside of the portal mirror 17 and is one half reflected back toward the person on-stage. The image from the background display 15 does the same thing as the image from overhead display 16. Fifty percent of the light (image) goes straight through the portal mirror 17 and out to the audience 26. The other 50% is bounced onto the monitor mirror 18 and back into the underside of the portal mirror 17. Fifty percent of that reflected image can then also be seen by the performer. The light 21 illuminating the person on-stage also passes 50% out towards the audience 26 while the other half is directed onto the monitor mirror 18 and reflected back up off of the underside of the portal mirror 17 back to the performer. With this system, therefore, the person 20 in the performance area 13 is able to see the same image that the audience 26 sees. The only difference is that the person 20 only sees half of the brightness of the composite image that the audience 26 sees. The composite image is a combination of reflections from the monitor mirror 18 including the overhead display 16, background display 15 and stage person/object 20. The obvious benefit of the monitor mirror 18, therefore, is that the person 20 in the performance area 13 is able to follow exactly how everything is appearing to the audience without having to view an off-stage monitor or otherwise guess what the composite images looks like.

Figure 2:
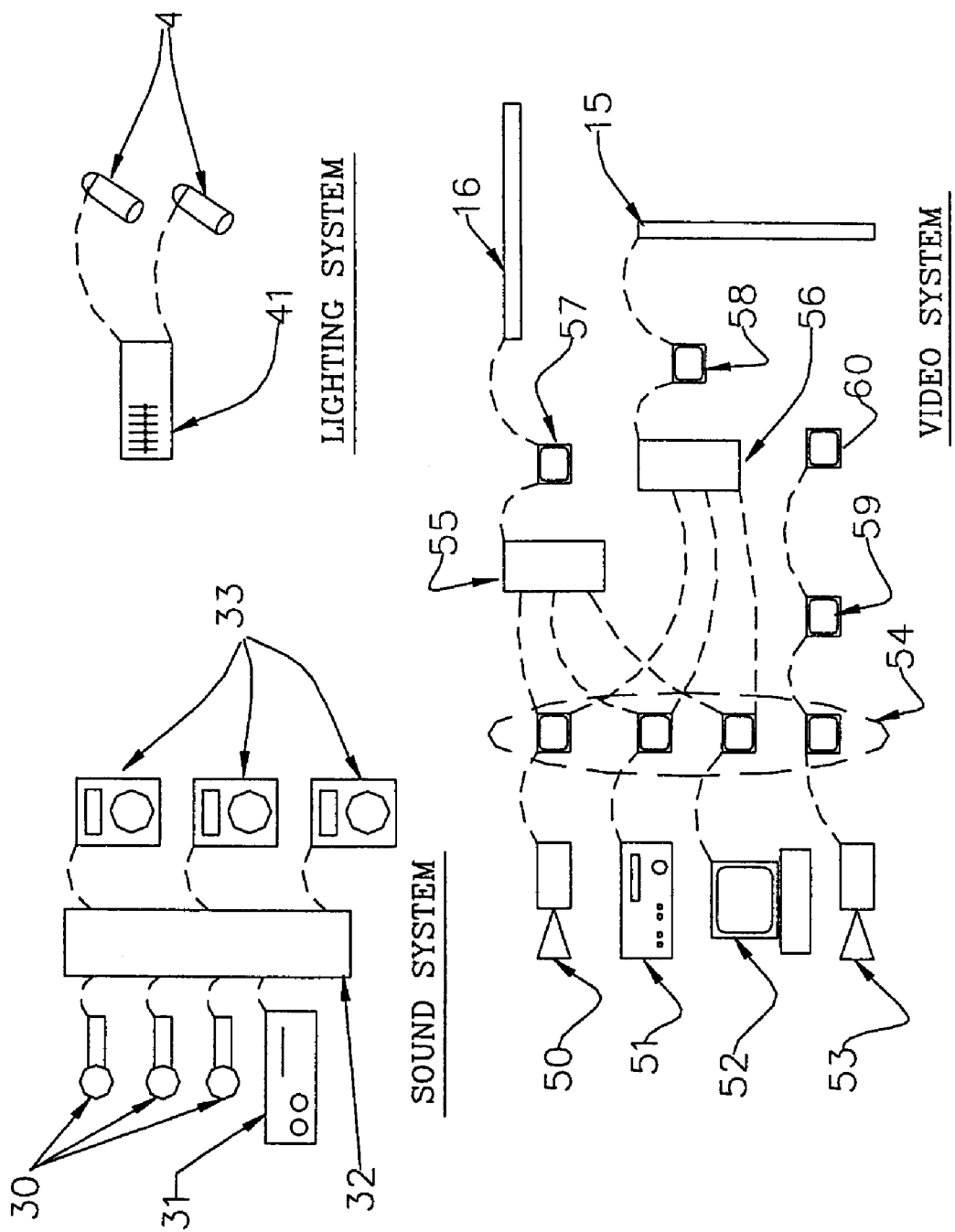
FIG. 2 is a flow chart diagram of the sound, lighting and video systems used to actuate the present invention.

FIG. 2 demonstrates schematically the sound, lighting and video systems that may be used in connection with a preferred embodiment of the image forming apparatus. The sound system can be made up of a series of different microphones 30 and playback devices 31 that are fed into a mixer and amplifier system 32. The mixer and amplifier 32 then sends the music out through various loudspeakers 33. The microphones 30 may be placed in the performance area 13, before an off-stage announcer, and/or in an off-stage set.

Obviously, the playback device 31 or devices may play prerecorded messages. The loudspeakers 33 may be positioned for the audience to hear, as a stage monitor speaker, and/or at an off-stage set.

The lighting system is made up of a lighting controller and dimmer system 41 connected to the various lighting hardware 40. The lighting controller 41 may control both on-stage and off-stage lighting elements.

The video system may incorporate several different input components. These components may include an off-stage camera 50, a video playback 51, a graphics video device 52, and/or an audience view camera 53. The system may also include more than one of each of these input components. Those signals are observed by operators on the source monitors 54 prior to or contemporaneous with utilizing the signals in the video controllers 55 and 56. The overhead video display controller 55 receives input from one or more of the graphics video source 32, video playback source 51, or off-stage camera 50. Likewise, the back panel display video controller 56 receives input from one or more of the same components. Those controllers 55 and 56 are connected to video monitors 57 and 58 that are likewise connected to the overhead display 16 and background display 15. The audience camera 53 is fed to a stage monitor 59 and/or to an off-stage set monitor 60.

Figure 3:
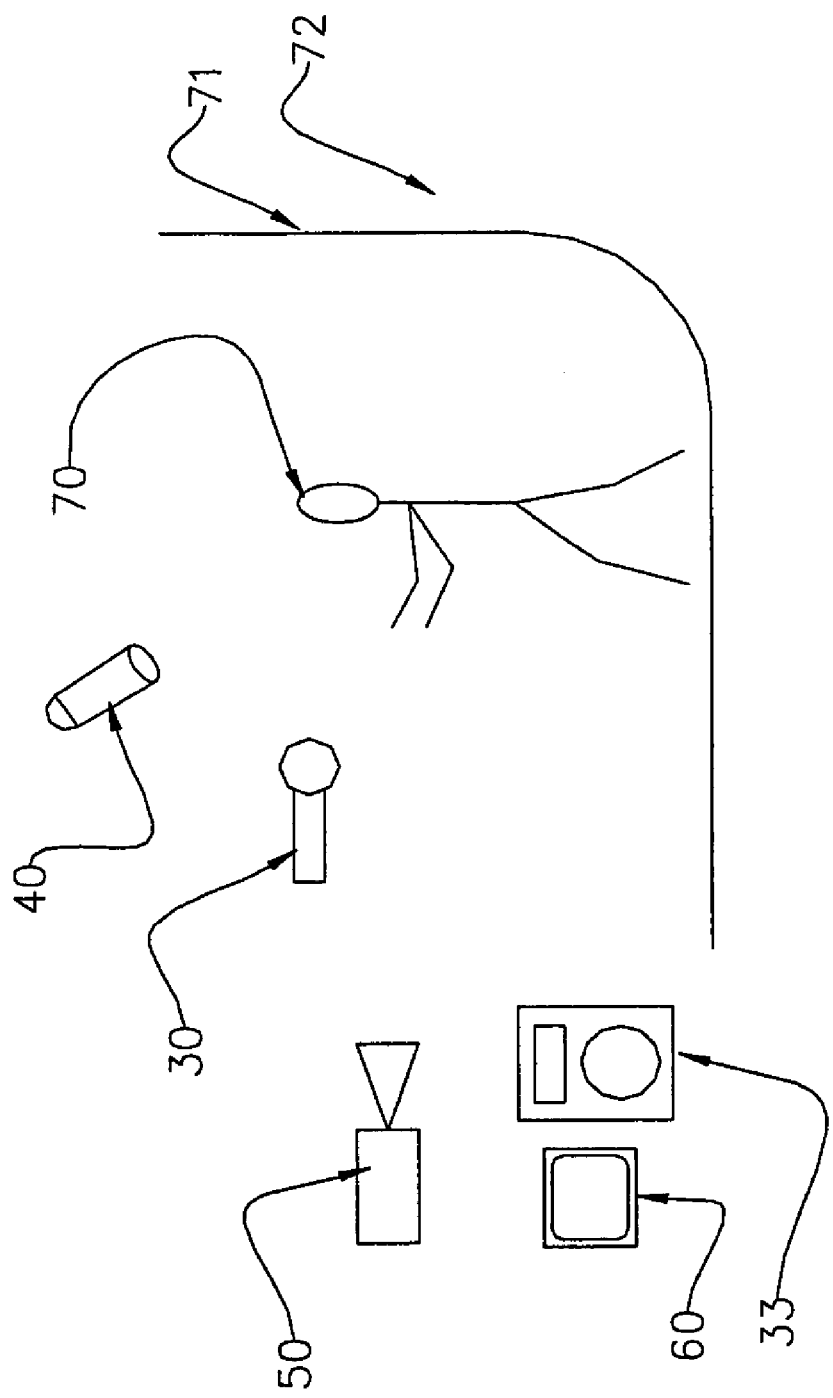
FIG. 3 is a side elevation schematic view of an off-stage set that may be used in connection with the present invention.

FIG. 3 illustrates a schematic of an off-stage set 72. The off-stage set includes video camera 50 that captures what is going on the off-stage set 72 so that it may be optionally input onto one or both of the display panels 15 and 16 on the stage 10. The off-stage set includes an off-stage person 70 and, optionally, a background 71. The background 71 will often be a primary color which is then subtracted from the final signal in a well-known process called "keying" that is familiar to those of skill in the art. The off-stage set 72 further includes a microphone 30 and lighting 40 as well as an off-stage set speaker 33. A monitor 60 allows the person 70 to see what is happening on-stage 10, because the monitor 60 is receiving input from the audience view camera 53.

Loudspeakers and microphone placements on both the main stage and the off-stage set are positioned so that offstage performers and on-stage performers may interact together in real time in addition to whatever playback sources may also be utilized. Also, the lighting on the off-stage set is carefully controlled so that the transmitted off-stage image will appear similar to the images seen on the main stage to better carry off the virtual image seen by the audience.

Figure 4:
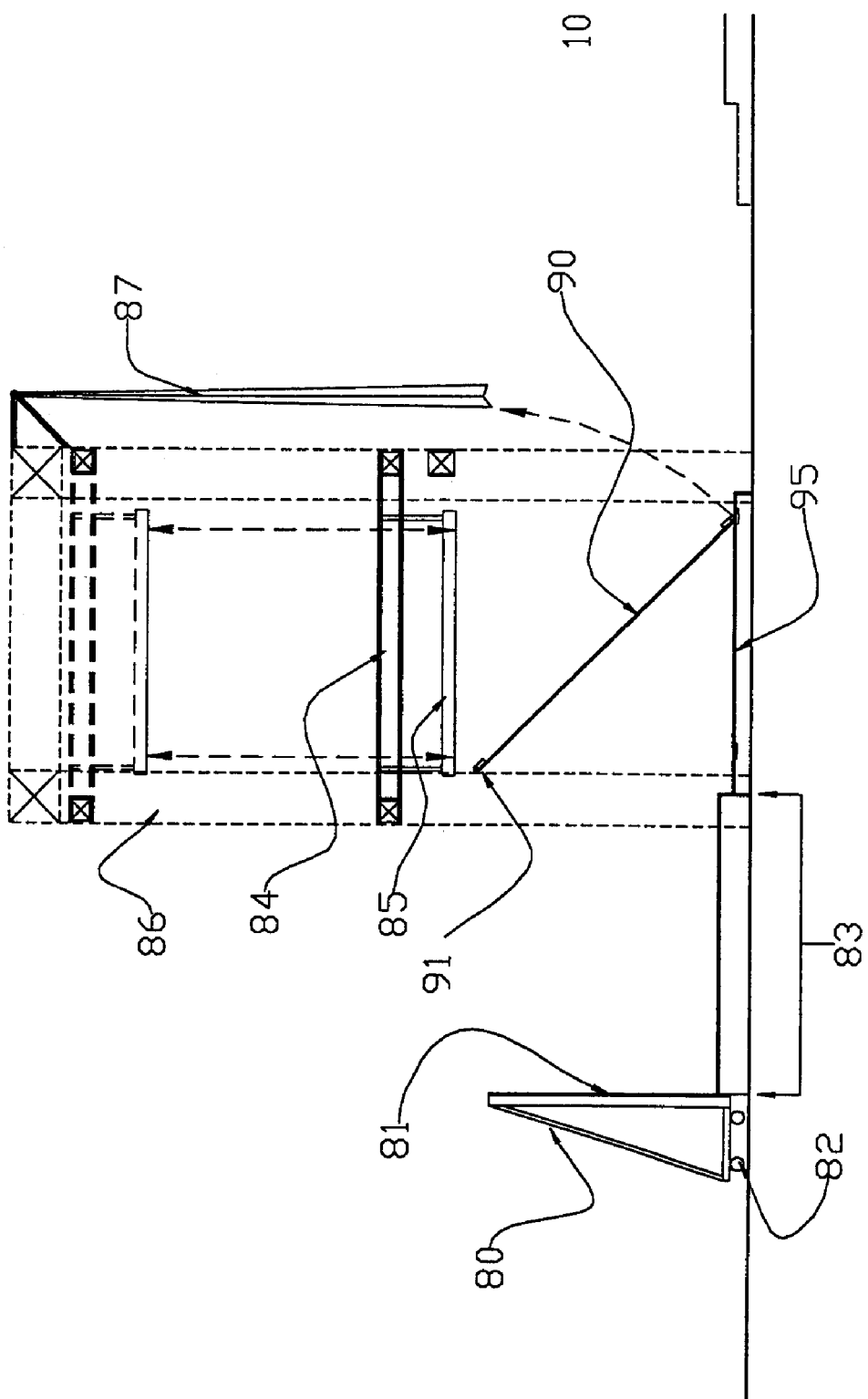
FIG. 4 is a side elevation schematic view of an apparatus embodying the present invention.

FIG. 4 sets forth in more structural detail the stage 10. The back display 80 includes the panel display 81 on a frame and roller 82. This allows the display 80 to be moved laterally and forward and backwards with respect to the audience. The rollers 82 also allow for easy access to placing large objects on and off the performance area 83. In a preferred embodiment, the flat panel video display 81 is nine feet tall and 12–16 feet wide. Typically, the screen is approximately 4–24 inches thick; however, the constant evolution of this technology is towards even thinner technologies—some prototypes as thin as a piece of fabric. Manufacturers of suitable video displays include Sony and Lighthouse Technologies, Inc. Preferably, the surface of the video display 81 includes a surface that diffuses or scatters incident light from the stage or elsewhere and does not reflect off of the display surface.

The second flat panel video display 85, also referred to as the overhead display, is suspended from and supported by frame 84. Frame 84 is attached to trusses 86 that allows for the overhead display 85 to move up and down in the vertical direction in planes parallel to the plane defined by the display itself. Alternatively, not shown, the overhead display 85 may be suspended from the frame 84 so that the display 85 may move about within the plane defined by the video display 85 itself. In other words, the vertical height of the display would not change, but the horizontal position could be varied. In a further alternative, not shown, the display 85 may be moved about to planes not parallel to the plane of the display shown. Various asymmetrical or unbalanced images may be reflected to the audience. The total height that the overhead display 85 may move and is equal to at least the depth of the performance area 83 of the stage such that the images perceived by the audience 26 from the displays 15 and 16 may be arranged, when desired, to appear superimposed in the same virtual place. In a preferred construction, the performance area is twelve feet deep. Therefore, the overhead display 85 can move upward and downward twelve feet. The truss columns 86 are spaced fifteen feet apart on their outside edges. Finally, a proscenium drapery 87 covers the front of the apparatus so that the overhead display 85 and supporting framework 84 can not been seen by the audience viewing from audience area 100. The length and width of the overhead display 85 are preferably comparable to the dimensions of the back display 81.

The portal mirror 90 is tilted at approximately a 45° angle to the vertical plane in front of the audience. The height of the portal mirror 90 is 14 feet, 4 inches. The portal mirror is comprised of stretched optical films that have been metalized to the point that they are 50% silvered. Fifty percent silvered is preferable, because many desirable effects rely heavily on the fact that images on either the overhead display or background display cannot be readily discerned from each other. The stretched optical films allows the mirror to be light weight and relatively easily replaceable. Certainly, it is easier to handle then an actual glass mirror. The portal mirror 90 is fitted with a hinged mounting and articulation mechanism 91, so that the mirror 90 can be rotated upwardly. As the portal mirror swings up, persons or things can move onto and off of the stage and into the audience area. The monitor mirror 95 is also made up of stretched optical film. It has the same dimensions as the overhead display 85. The monitor mirror film is 100% silvered to reflect all the light that it receives. Acceptable films that may be used include Mylar polyester films as manufactured by Coutant Performance Films, Inc. or other such as 3M.

The height of the portal mirror 90 and the height of the back display 80 may vary at the preference of a presentation designer. With respect to the height of the back display 80, it should be no less than six feet to accommodate the height of an average person in the performance area 83. Similarly, the length of the portal mirror 90 should be no less than about 9½ feet in order to be vertically high enough (when mounted at a 45° angle) to be as tall as an average six feet tall person. Alternatively, if a portal mirror is mounted other than at the 45° angle shown, the length of the portal mirror can be adjusted with the angle in order to cover the preferable minimum six foot height. Actors or objects in the performance area that are taller than six feet (as described) or even nine feet (as shown in FIG. 4) will require proportionate adjustments to the height and length of a back display and portal mirror.

The system described herein can be adapted to various different situations depending on the locational requirements. For instance, if there is little or no overhead space in which to mount a truss frame work, then the second flat panel video display can be mounted parallel to or below the floor of the stage. In that case, the portal mirror would be mounted so that it inclines toward the audience and reflects the images from underneath outwardly towards the audience. Further alternatively, if the location requirements demanded, then the second flat panel video display could be placed vertically like the back display but in the right or left hand wing of the stage. In this way, the portal mirror would be vertical in the side elevation yet angled in a top or bottom view.

In further variations of the invention, the degree of silvering of the portal mirror can be varied so that images that are reflected off of the portal mirror can be given a different "look" or "texture" to the audience. Further, although the preferred embodiments illustrated in the drawings show the overhead panel display parallel to the plane of the stage, the second flat panel display could be at an angle and the portal mirror angle adjusted accordingly. This could provide further flexibility with respect to the auditorium or location where the images will be formed.

Figure 5:
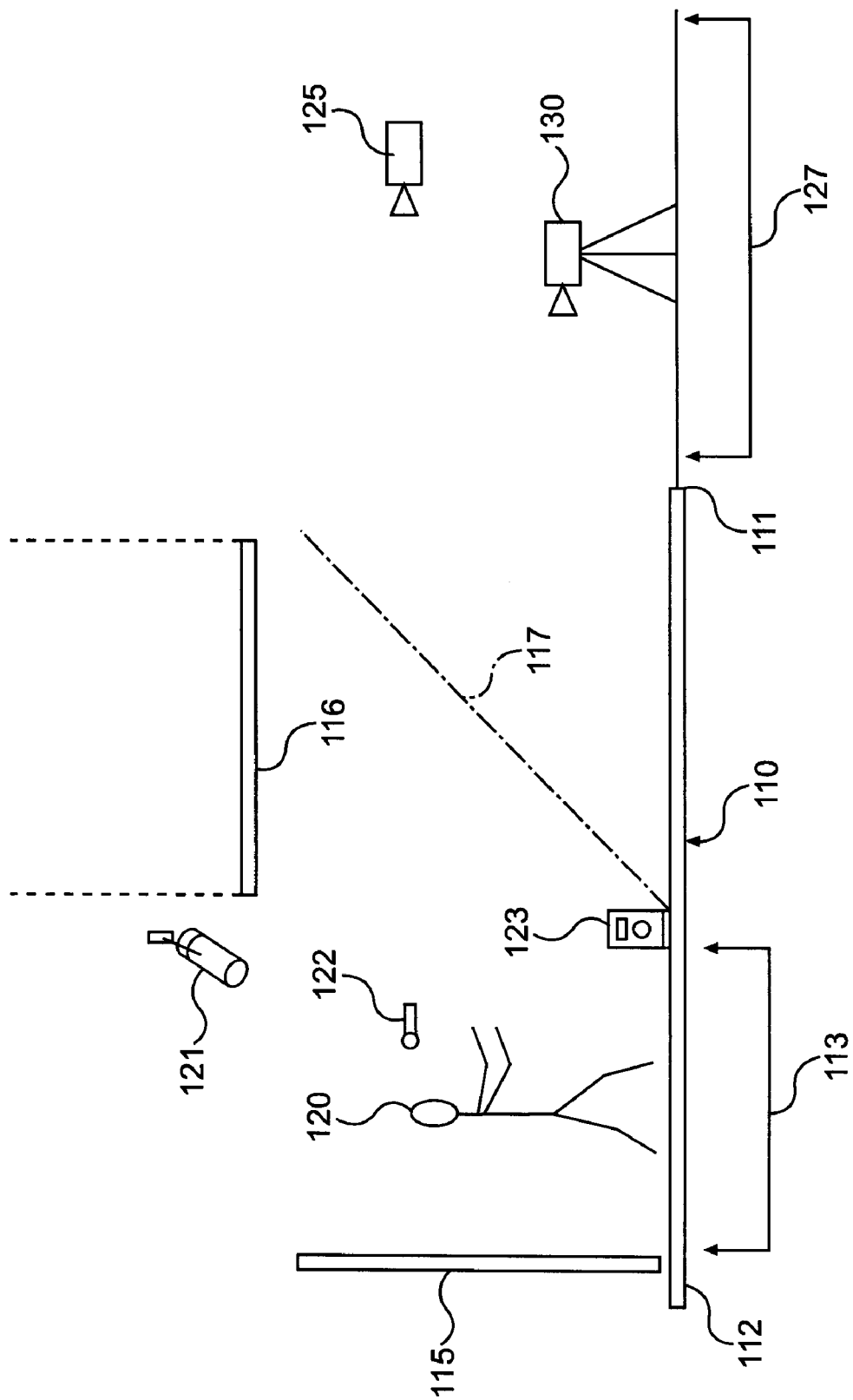
FIG. 5 is a schematic side elevation view of an apparatus embodying an alternative embodiment of the present invention.
Figure 6:
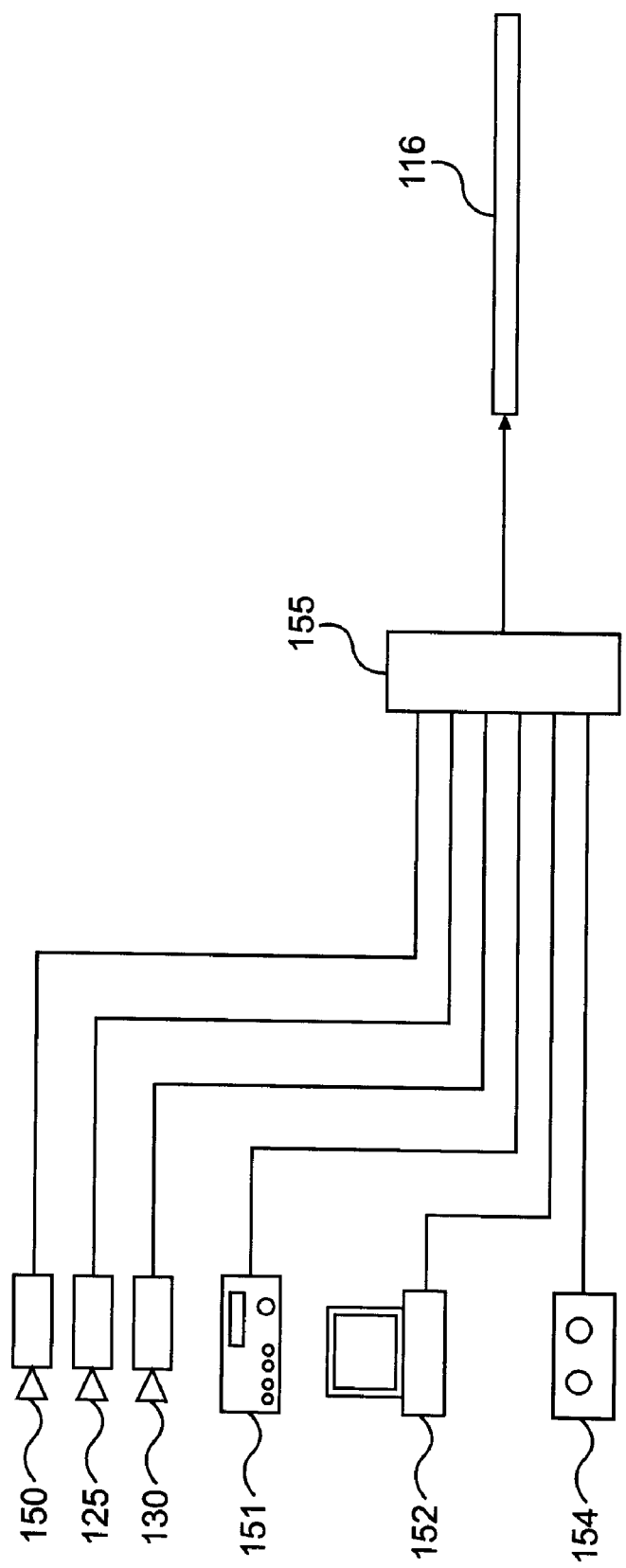
FIG. 6 is a flow chart diagram of the electronics used to actuate the alternative embodiment shown in FIG. 5.

FIGS. 5 and 6 illustrate an alternative embodiment of the present invention. In addition to performing before live audiences, the teachings of the present invention may also be used in connection with live and recorded performances before a video camera. The invention contemplates a stage where live actors can observe their own movements in a virtual background. This alternative embodiment even includes a teleprompter that allows actors to see their movements in the context of a virtual background on the same image as they see their prompting script or text.

Specifically, FIG. 5 illustrates an alternative stage 110 having a foreground side 111 and a background side 112. Mounted in the foreground side 111 is a portal mirror 117 similar to the portal mirror described earlier. Mounted on the background side 112 of the stage is a background 115. In between the background 115 and the portal mirror 117 is a performance area 113 where actors such as live actor 120 will perform. The background 115 may be a permanent stage setting or it may be a flat panel video display similar to flat panel video display 15 shown in FIG. 1. Alternatively, if the background 115 is a fixed set, then it may be a uniform color of blue (or any other specific tone) that may be keyed out using various digital imaging techniques as mentioned earlier. Similarly, the floor of the performance area 113 may likewise be the same color as the background 115 so that it may be keyed out and removed from the final video image. Those of skill in the art will be familiar with the specific tones that are most favorably used in order to most efficiently key out or eliminate the background 115 and floor 113 from the final video image. The portal mirror 117 is angled from the floor of the stage 110 upwardly to the foreground side 111. A flat panel video display 116 is suspended directly above the portal mirror 117. As illustrated, the display 116 is parallel to the stage 110, therefore, the angle of the portal mirror 117 is substantially 45 degrees. The partial silvering of the portal mirror 117 allows the images that are shown on the display 116 to be visible in the performance area 113 and to the actor 120 who is performing there while at the same time allowing the camera 125 to film the actor. As with the stage illustrated in FIG. 1, there may also be studio lighting 121, a studio microphone 122, and a studio speaker 123.

FIG. 1 also illustrates the video recording area 127 in which is mounted a video camera 125. Typically in a single studio, the area 127 is merely a continuation of the floor or stage 110. In some cases, however, there may be more of an amphitheater setting as in FIG. 1. The primary distinction between area 127 and stage 110 is that the area is on the opposite side of the portal mirror 117 from the performance area 113. This video camera 125 is similar to the audience camera 25 illustrated in FIG. 1 in that it records the images of the actor 120 acting live on the stage 110. In addition to the video camera 125, there may be one or more studio cameras 130 that are also recording the on stage actor 120.

The display 116 is suspended above the portal mirror 117. Alternatively, if the flat screen video display 116 were placed on the floor or under the stage 110, then the portal mirror 117 would be angled upwardly towards the backside 112 of the stage 110. As with the overhead display discussed earlier, the display 116 may move upwardly or downwardly or from side to side or asymmetrically. Alternatively, it may simply be fixed in a given studio. The actual hardware that makes up the flat panel video display 116 has already been fully described earlier in this application in connection with the flat panel video displays 15 and 16.

The display 116 is connected to one or more different video image input components. With reference now to FIG. 6, and as noted earlier, these input components may include an off stage camera 150, a video playback 151, a graphics video device 152, and or the video camera 125. In the preferred embodiment, there is also included a teleprompter 154. One or more of these input components is connected to a video effects controller 155 like the video display controllers 55 and 56 shown in FIG. 2. The video effects controller 155 can transmit any one of the video signals to the flat panel video display 116 to make it visible to the actor 120. Alternatively, the video effects controller 155 can combine two or more of the video images to make a composite image that is visible to the actor 120.

In a preferred example, for instance, the video effects controller 155 receives input from the teleprompter 154, from a video playback 151, from a graphics video device 152, and from the video camera 125. The video effects controller 155 may also include a system able to accomplish the keying out of the background 115 and stage 113 so that the actors 120 and/or any specific props may be filmed and set into a virtual background from, for instance, the graphics video device 152 and or the video playback 151. As recognized by those of skill in the art, the video effects controller 155 will invert the image seen on the display 116 so that the reflected image off of the portal mirror 117 is properly oriented when seen by a person 120. In addition to seeing the virtual image in which the actor 120 is being filmed, therefore, the actor may also be fed a script or text from the teleprompter 154. Therefore, the actor does not have to look away to view a remote teleprompter. Also, the actor can immediately see in real time how he or she is interacting with the virtual background that is being plugged into the composite image through the video effects controller 155.

The off-stage set described in connection with FIG. 3 may also be a video image input component. Specifically, the video images recorded from the offstage set may be transmitted to the video effects controller 155, optionally processed, and then combined with other images into a composite image on the video display 116. In other words, video images from the off-stage set are simply a further alternative video source, like the other video input components, connected to the video effects controller 155.

While the invention has been described with reference to specific embodiments thereof, it will be understood that numerous variations, modifications and additional embodiments are possible, and accordingly, all such variations, modifications, and embodiments are to be regarded as being within the spirit and scope of the invention.

What is claimed is:

1. Apparatus for displaying visual effects during presentations involving a stage and a viewing area wherein a video camera is mounted in the viewing area for recording action on the stage, the apparatus comprising:

the stage comprising a foreground side and a background side wherein the foreground side is adjacent the viewing area and the background side is on the side of the stage opposite the foreground side;

a background situated in the background side of the stage;

a partially-silvered, portal mirror wherein the portal mirror is mounted toward the foreground side of the stage and further wherein the portal mirror is mounted at an angle to a vertical plane in front of the video camera;

a performance area between the background and the portal mirror; and a flat panel video display that is not visible to the video camera wherein the images appearing on the flat panel video display are reflected off of the portal mirror and create a virtual image visible in the performance area;

whereby a person in the performance area who is looking towards the portal mirror can see the images from the flat panel video display.

2. The apparatus in claim 1 further comprising a video display controller that is
   a) connected to the flat panel video display,
   b) connected to the video camera, and
   c) connected to a video input component
   wherein the video display controller combines the video images from the video camera and the video input component and displays the composite image on the flat panel video display.

3. The apparatus described in claim 1 wherein,
   the portal mirror is mounted at an angle so that it inclines upwardly towards the foreground side of the stage, and
   the flat panel video display is mounted above the stage and above the portal mirror so that the images appearing on the flat panel video display are reflected off of the portal mirror and toward the performance area.

4. The apparatus described in claim 1 wherein,
   the portal mirror is mounted at an angle so that it inclines upwardly away from foreground side of the stage, and
   the flat panel video display is mounted below the portal mirror so that the images appearing on the flat panel video display are reflected off of the portal mirror and toward the performance area.

5. The apparatus described in claim 1 further comprising:
   an off-stage set comprising a second video camera, a second background and a second performance area wherein the second video camera records images from the second background and second performance area and further wherein those images recorded by the second video camera are shown on the flat panel video display.

6. A method for creating visual effects during performances comprising the following steps:
   providing a stage and a viewing area in which a video camera is mounted comprising:
   a) the stage comprising a foreground side and a background side wherein the foreground side is adjacent the viewing area and the background side is on the side of the stage opposite the foreground side;
   b) a background situated in the background side of the stage;
   c) a partially-silvered, portal mirror wherein the portal mirror is mounted toward the foreground side of the stage and further wherein the portal mirror is mounted at an angle to a vertical plane in front of the video camera;
   d) a performance area between the background and the portal mirror; and
   e) a flat panel video display that is not visible to the video camera wherein the images appearing on the flat panel video display are reflected off of the portal mirror;

sending signals to the flat panel video display that form images thereon visible in the performance area; and
   placing a person in the performance area and directing lights on them so they are visible to the video camera,
   whereby the person in the performance area sees the images from the flat panel video display.

7. The method described in claim 6, further comprising:
   providing a video display controller that is connected to the flat panel video display, connected to the video camera, and connected to a video input component;
   combining in the video display controller the video images from the video camera and the video input component; and
   displaying the composite image on the flat panel video display.

8. The method described in claim 7, wherein the background has a primary color adapted to be keyed out of a video signal, and the method further comprising
   keying out the background from the image recorded by the video camera prior to combining that video camera image with the images from the video input component.

9. The method described in claim 6, further comprising the step of providing an off-stage set comprising a second video camera, a second background and a second performance area wherein the second video camera records images from the second background and second performance area and further wherein those images recorded by the second video camera are fed into the flat panel video display.

10. The method described in claim 7, further comprising:
    providing an off-stage set comprising a second video camera, a second background and a second performance area wherein the second video camera records images from the second background and second performance area;
    connecting the second video camera to the video display controller;
    combining the images from the second video camera with the images from the video camera and the video input component; and
    displaying the composite image on the flat panel video.

11. A video stage system comprising:
    the stage comprising a foreground side and a background side wherein the foreground side is adjacent a video recording area and the background side is on the side of the stage opposite the foreground side;
    a background;
    a partially silvered, portal mirror wherein the portal mirror is mounted toward the foreground side of the stage and further wherein the portal mirror is mounted at an angle to a vertical plane in front of the video recording area;
    a performance area between the background and the portal mirror;

a video recording area comprising a video camera mounted in it for recording action in the performance area;

a flat panel video display that is not visible to the video camera wherein the images appearing on tie flat panel video display are reflected off of the portal mirror and create a virtual image visible in the performance area; and a video effects controller wherein the video effects controller receives and displays on the flat panel video display at least the signals from the video camera mounted in the video recording area.

12. The video stage system described in claim 11, wherein the background and the performance area have a primary color adapted to be keyed out of a video signal.

13. The video stage system described in claim 11, further comprising a teleprompter, wherein the video effects controller further receives input from, and displays on the flat panel video display, signals from the teleprompter.

14. The video stage system described in claim 12, further comprising an alternative video source connected to the video effects controller wherein the video effects controller is adapted to
a) receive input from, and display on the flat panel video display, signals from the alternative video source, and
b) process the signals from the video camera to key out the background and performance areas,
whereby a composite image on the flat panel video display is visible in the performance area.

15. The video stage system described in claim 13, further comprising an alternative video source connected to the video effects controller wherein the video effects controller is adapted to
a) receive input from, and display on the flat panel video display, signals from the alternative video source, and
b) process the signals from the video camera to key out the background and performance areas,
whereby a composite image on the flat panel video display is visible in the performance area.

16. A method for creating a composite video image comprising the following steps:
a) providing a stage and a video image filming area in which a video camera is mounted, the stage comprising a foreground side and a background side wherein the foreground side is adjacent the video recording area and the background side is on the side of the stage opposite the foreground side;

a background having a primary color;

a partially-silvered, portal mirror wherein the portal mirror is mounted toward the foreground side of the stage and further wherein the portal mirror is mounted at an angle to a vertical plane in front of the video recording area;

a performance area between the background and the portal mirror; and a flat panel video display that is not visible to the video camera wherein the images appearing on the flat panel video display are reflected off of the portal mirror;

b) providing a video effects controller connected to the video camera and a teleprompter and also to the flat panel video display;

c) combining the signals from the video camera and teleprompter in the video effects controller;

d) sending signals from the video effects controller to the flat panel video display;

e) placing a person in the performance area and directing lights on them so they are visible to the video camera, whereby the person in the performance area sees the composite image from the flat panel video display.

17. The method described in claim 16, further comprising the steps of
a) providing a graphics computer,
b) connecting the graphics computer to the video effects controller,
c) combining signals from the graphics computer with other video signals in the video effects controller, and
d) sending the combined signals to the flat panel video display where the composite image becomes visible to a person in the performance area.

18. The method described in claim 17, wherein the video effects controller is adapted to key out of the video camera signal the primary colored background and the combined signal is then sent to the flat panel video display.

* * * * *